United States Patent [19]

Hefner, Jr.

[11] Patent Number: 4,539,377

[45] Date of Patent: Sep. 3, 1985

[54] ALKENYLPHENYLGLYCIDYL ETHER CAPPED HYDROXYSTYRYL PYRIDINES (PYRAZINES) AND POLYMERS THEREOF

[75] Inventor: Robert E. Hefner, Jr., Lake Jackson, Tex.

[73] Assignee: The Dow Chemical Company, Midland, Mich.

[21] Appl. No.: 632,346

[22] Filed: Jul. 19, 1984

[51] Int. Cl.$^3$ ............................................. C08F 283/06
[52] U.S. Cl. ................................... 525/401; 525/403; 528/250; 528/252
[58] Field of Search ................ 525/401, 403; 528/250, 528/252

[56] References Cited

U.S. PATENT DOCUMENTS

| | | | |
|---|---|---|---|
| 4,362,860 | 12/1982 | Ratto | 528/248 |
| 4,471,107 | 9/1984 | Peake | 528/248 |
| 4,500,690 | 2/1985 | Latulip | 525/502 |

Primary Examiner—Lucille M. Phynes
Attorney, Agent, or Firm—B. G. Colley

[57] ABSTRACT

Alkenylphenylglycidyl ether capped styryl pyridines and styryl pyrazines are prepared by etherifying with an alkenylphenylglycidyl ether the reaction product of (A) a substituted pyridine and/or pyrazine with (B) a substituted aromatic aldehyde with the proviso that at least one of the components (A) or (B) contains a hydroxyl group which is susceptible to etherification by an alkenylphenylglycidyl ether. These alkenylphenylglycidyl ether capped styryl pyridines and pyrazines can be homopolymerized or copolymerized with other materials to produce polymers having excellent high temperature resistance, good mechanical strength and excellent processability and are used to make cured composites with heat resistant fibers that have applications in high temperature environments such as engine compartments and/or fire walls.

10 Claims, No Drawings

ALKENYLPHENYLGLYCIDYL ETHER CAPPED HYDROXYSTYRYL PYRIDINES (PYRAZINES) AND POLYMERS THEREOF

BACKGROUND OF THE INVENTION

This invention relates to thermosettable alkenylphenylglycidyl ether capped hydroxystyryl pyridine and pyrazine compositions having improved processability and excellent thermal stability.

Hydroxystyryl pyridines are known from Yan et al, Org. Coatings and Applied Science Proceedings, 46:482-488 (ACS Preprint 183 National Meeting, Las Vegas, Nev. 1982); Chiang et al, J. Org. Chem., 10:21-25 (1945); Bramsch, Chem. Berichte, 42:1193-1197 (1909); Franke, Chem. Berichte, 38:3724-3728 (1905) and Ser. No. 588,597 filed Mar. 12, 1984 now U.S. Pat. No. 4,525,938, granted May 7, 1985. The hydroxystyryl pyridines typically possess high melting points and low solvent solubility, hence conventional processing, such as impregnation of a fiberglass mat by hot melt or solvent impregnation techniques is extremely difficult. Hydroxyl groups present in the cured (thermoset) hydroxystyryl pyridines can induce moisture sensitivity and susceptibility to chemical attack by solvents as well as aqueous media such as dilute sodium hydroxide solution. Reactivity of the hydroxystyryl pyridines is poor, with prolonged cure temperatures of 250° C. to 300° C. or higher being required. The condensation curing reaction to provide a hydroxypolystyryl pyridine evolves water, hence voids and bubbles are typically present in the cured products. These defects are deleterious to the mechanical properties of the cured product.

More recently, vinyl styryl pyridines and vinyl polystyryl pyridines have been developed, for example as taught by Ratto, et al in U.S. Pat. No. 4,362,860. Said vinyl styryl pyridine compositions provide some improvement in reactivity, being initially cured at temperatures of 150° C. to 200° C., however, many of the aforementioned problems remain. The reaction times and reaction temperatures required for synthesis of vinyl styryl pyridines frequently dimish the polymerizable vinyl group content of the finished product thus leading to only an incremental improvement in reactivity.

Various other styryl pyridine compositions are known, however, these compositions typically possess the aforementioned problems.

The present invention provides novel thermosettable alkenylphenylglycidyl ether capped hydroxystyryl pyridine and/or pyrazine compositions having excellent processability being typically low melting, highly solvent soluble and highly reactive. Curing does not evolve gaseous products, such as water vapor, thus void-free cured products are readily obtained. All of these property improvements are obtained without a significant loss in thermal stability. The process of the present invention uses a alkenylphenylglycidyl ether which when stoichiometrically reacted with the hydroxystyryl pyridine and/or pyrazine provides essentially total capping of the hydroxyl groups of the hydroxystyryl pyridine and/or pyrazine without dimerization or oligomerization of the alkenylphenylglycidyl ether as a side reaction. These compositions are useful in the preparation of homopolymers or copolymers which can take the form of unfilled or filled castings, fiberglass laminates, graphite or carbon fiber reinforced composites, coatings and the like.

SUMMARY OF THE INVENTION

One aspect of the present invention concerns alkenylphenylglycidyl ether capped styryl pyridine or styryl pyrazine compositions resulting from etherifying with an alkenylphenylglycidyl ether a product resulting from reacting (A) at least one of
 (1) one or more pyridine compounds represented by the formula

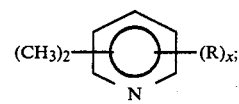

(2) one or more pyrazine compounds represented by the formula

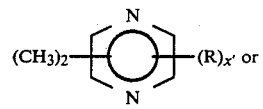

(3) a mixture of 1 and 2; with (B) a substituted aromatic aldehyde represented by the formula

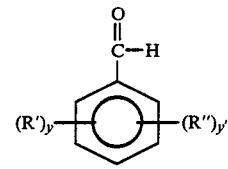

wherein each R is independently hydrogen, hydroxyl, methyl or ethyl; each R' is independently a hydroxyl or a

group; each R" is independently hydrogen, methyl or ethyl; x has a value of 3; x' has a value of 2; y has a value of 1 or 2; y' has a value of 3 or 4; the sum of y and y' has a value of 5; and with the proviso that at least one of R or R' is a hydroxyl group to provide a hydroxyl functional precursor which is then reacted with (C) an alkenylphenylglycidyl ether having the formula

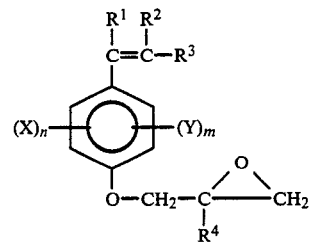

wherein each $R^1$, $R^2$, $R^3$ and $R^4$ is independently hydrogen or a hydrocarbyl group having from 1 to 3 carbon atoms; each X is independently hydrogen, a hydrocarbyl group having from 1 to 4 carbon atoms, chlorine, bromine, a phenyl group or a methoxy group; each Y is independently hydrogen or a hydrocarbyl group having from 1 to 4 carbon atoms and n and m are positive integers, and the sum of n plus m has a value of 4 whereby at least about one percent of the rings of the reaction product of (A) and (B) is etherified with said alkenylphenylglycidyl ether.

Preferably about 20 to 100 and most preferably about 30 to about 75 percent of the rings of the reaction product of (A) and (B) are etherified with said alkenylphenylglycidyl ether.

Another aspect of the present invention pertains to homopolymers or copolymers of the aforementioned alkenylphenylglycidyl ether capped hydroxy styryl pyridines and/or alkenylphenylglycidyl ether capped hydroxy styryl pyrazines.

A further aspect of the present invention pertains to copolymerizable mixtures of (A) at least one of the aforementioned alkenylphenylglycidyl ether capped hydroxy styryl pyridines and/or alkenylphenylglycidyl ether capped hydroxy styryl pyrazines; and (B) at least one material selected from
  (1) styryl pyridines and/or prepolymers and polymers thereof;
  (2) vinyl styryl pyridines and/or prepolymers and polymers thereof;
  (3) bismaleimides and/or polymaleimides;
  (4) alkenylphenol capped styryl pyridines and/or prepolymers and polymers thereof;
  (5) hydroxystyryl pyridines and/or prepolymers and polymers thereof; or
  (6) mixtures thereof in any proportion and combination.

Another aspect of the present invention pertains to polymers and/or cured products of the aforementioned copolymerizable and/or curable mixtures.

A further aspect of the present invention pertains to articles prepared from the aforementioned polymers and/or cured products.

DETAILED DESCRIPTION OF THE INVENTION

The alkenylphenylglycidyl ethers employed herein are prepared by the reaction of an alkenylphenol represented by the formula

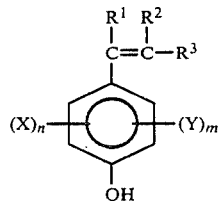
(V).

wherein each $R^1$, $R^2$ and $R^3$ is independently hydrogen or a hydrocarbyl group having from 1 to about 3 carbon atoms; each X is independently hydrogen, a hydrocarbyl group having from 1 to about 4 carbon atoms, chlorine, bromine, a phenyl group or a methoxy group; each Y is independently hydrogen or a hydrocarbyl group having from 1 to about 4 carbon atoms and n and m are positive integers and the sum of n plus m has a value of 4 with an epihalohydrin and a basic-acting material. The reaction generally involves two distinct steps: coupling reaction of the epihalohydrin and alkenylphenol to provide a halohydrin intermediate and dehydrohalogenation reaction of the halohydrin intermediate to provide the glycidyl ether product. Suitable catalysts and reaction conditions for preparing these epoxides are described in the *Handbook of Epoxy Resins* by Lee and Neville, McGraw-Hill (1967) which is incorporated herein by reference.

Typical alkenylphenylglycidyl ethers represented by formula IV include p-isopropenylphenyl glycidyl ether, p-vinylphenylglycidyl ether, m-vinylphenylglycidyl ether, methyl-p-isopropenylphenylglycidyl ether, 3-chloro-4-isopropenylphenylglycidyl ether, and the like. p-Isopropenylphenylglycidyl ether is most preferred as the alkenylphenylglycidyl ether.

The alkenylphenylglycidyl ether capped hydroxy styryl pyridine or pyrazine compositions of the present invention are prepared by reacting a hydroxyl functional styryl pyridine or pyrazine precursor with an alkenylphenylglycidyl ether. The precursor compositions can be monomeric, oligomeric or polymeric. The precursor compounds are prepared by condensing in the presence of an acidic catalyst compounds represented by formulas I and II or mixtures thereof with a substituted aromatic aldehyde represented by formula III with the proviso that at least one of the compounds represented by formulas I, II and III contains an aromatic hydroxyl group.

Suitable acidic catalysts which can be employed include, for example, sulfuric acid, hydrochloric acid, zinc chloride, acetic anhydride, aluminum trichloride, toluenedisulfonic acid, trichloroacetic acid, acetic acid, mixtures thereof and the like. The catalysts can be employed in quantities of from about 0.5 to about 20, preferably from about 2 to about 5, weight percent based upon the total weight of the reactants. The reaction can be conducted in the absence of a catalyst but the reaction time is typically increased.

The condensation reaction is conducted in an atmosphere exclusive of oxygen, preferably with removal of water generated by the reaction. An inert atmosphere such as nitrogen, xenon, argon, etc. is appropriate.

The condensation reaction is usually conducted at a temperature of from about 130° C. to about 230° C., preferably from about 140° C. to about 190° C. for from about 0.5 to about 24 hours, preferably from about 1 to about 8 hours.

The reactants are usually employed in quantities which provide a mole ratio of substituted pyridine and/or substituted pyrazine to substituted aromatic aldehyde of from about 0.33:1 to about 6:1, preferably from about 1:1 to about 3:1.

Suitable substituted pyridines which can be employed include, for example, 2,3-dimethyl pyridine, 2,4-dimethyl pyridine, 2,5-dimethyl pyridine, 2,6-dimethyl pyridine, 3,4-dimethyl pyridine, 3,5-dimethyl pyridine, 3,5-dimethyl-2-ethyl pyridine, 2,3,4,6-tetramethyl pyridine, 2,3,5-trimethyl pyridine, 2,3,6-trimethyl pyridine, 2,4,5-trimethyl pyridine, 2,4,6-trimethyl pyridine, 2,4-dimethyl-6-hydroxy pyridine, 2,6-dimethyl-4-hydroxy pyridine, 2,6-dimethyl-3-hydroxy pyridine, 2,4,6-trimethyl-5-hydroxy pyridine, mixtures thereof and the like.

Suitable substituted pyrazines which can be employed include, for example, 2,5-dimethyl pyrazine, 2,3-dimethyl pyrazine, 2,6-dimethyl pyrazine, 2,3,5-trimethyl pyrazine, 2,3,5,6-tetramethyl pyrazine, 2,5-dimethyl-6-hydroxyl pyrazine, 2,5-dimethyl-3-ethyl pyrazine, mixtures thereof and the like.

Suitable substituted aldehydes which can be employed herein include, for example, 2-hydroxy benzaldehyde, 3-hydroxy benzaldehyde, 4-hydroxy benzaldehyde, 2-hydroxy-3-methyl benzaldehyde, 2-hydroxy-3-ethyl benzaldehyde, 4-hydroxy-3,5-dimethyl benzaldehyde, terephthaldehyde, 2,6-dihydroxy benzaldehyde, methyl terephthaldehydes, dimethyl terephthaldehydes, ethyl terephthaldehydes, mixtures thereof and the like.

Several hydroxy styryl pyridine precursors have been described by Chiang and Hartung in *J. Org. Chem.*, Vol. 10, pp. 21–25 (1945); by Bramsch in *Chemische Berichte*, Vol. 42, pp. 1193–1197 (1909); Franke in *Chemische Berichte*, Vol. 38, pp. 3724–3728 (1905) and Yan, et al in *Org. Coatings and Applied Poly. Sc. Proc.*, Vol. 46, pp. 482–488 (1982) published by the American Chemical Society.

A monomeric hydroxy styryl pyridine and/or pyrazine precursor can be oligomerized (prepolymerized) typically by heating at a temperature of about 180° C. to about 300° C. for from about 0.5 to about 8 hours. Polymerization is completed at a temperature of from about 250° C. to about 300° C. for an additional 1 to about 10 hours. The hydroxyl styryl pyridine and/or pyrazine products obtained by the aforementioned condensation reaction can be fractionated to provide monomeric and oligomeric precursors employing methods well known to the skilled artisan. Such methods, include, for example, preparative gel permeation chromatography, solvent fractionation or extraction and recrystallization.

If desired, the hydroxyl styryl pyridine and/or pyrazine precursor materials can be reacted with less than stoichiometric quantities of alkenylphenylglycidyl ether. This provides alkenylphenylglycidyl ether capped hydroxy styryl pyridine and/or hydroxy styryl pyrazine compositions with unreacted hydroxyl groups. Although these compositions are less preferred, it is still a useful composition of the present invention.

Typical hydroxystyryl pyridines and pyrazines include those prepared by reaction of p-hydroxybenzaldehyde with 2,6-dimethylpyridine, p-hydroxybenzaldehyde with 2,4-dimethylpyridine, p-hydroxybenzaldehyde with 2,4,6-trimethylpyridine, p-hydroxybenzaldehyde with a mixture of 2,6-dimethylpyridine and 2,4,6-trimethylpyridine, p-hydroxybenzaldehyde with 2,3,5,6-tetramethylpyrazine, p-hydroxybenzaldehyde with a mixture of 2,6-dimethylpyridine and 2,6-dimethylpyrazine, 2,6-dimethyl-4-hydroxybenzaldehyde with 2,6-dimethylpyridine, and the like.

In the process of the present invention, reaction of a 1 to 1 mole ratio of epoxide groups of the alkenylphenylglycidyl ether (formula IV) with the hydroxyl groups of the hydroxystyryl pyridine and/or pyrazine provides an alkenylphenylglycidyl ether capped hydroxystyryl pyridine and/or pyrazine wherein substantially all of the hydroxyl (—OH) groups of the hydroxystyryl pyridine and/or pyrazine are converted to

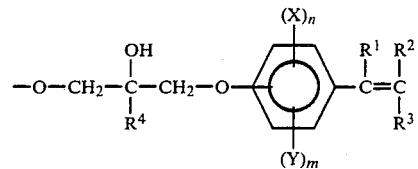

groups. The use of less than a 1 to 1 mole ratio of epoxide groups of the alkenylphenylglycidyl ether (formula IV) with the hydroxyl groups of the hydroxystyryl pyridine and/or pyrazine provides partial alkenylphenylglycidyl ether capping of the hydroxystyryl pyridine and/or pyrazine with some free hydroxyl groups remaining.

In the process of the present invention, the alkenylphenylglycidyl ether (formula IV) and the hydroxystyryl pyridine and/or pyrazine can be directly mixed and heated to provide the alkenylphenylglycidyl ether capped hydroxystyryl pyridine and/or pyrazine. Temperatures of from about 75° C. to about 200° C. are used with temperatures of about 90° to 120° C. being preferred. Reaction times of about 15 minutes to about 8 hours are used with reaction times of 60 minutes to about 4 hours being preferred.

In a preferred process of the present invention, the alkenylphenylglycidyl ether (formula IV) and the hydroxystyryl pyridine and/or pyrazine are mixed with a suitable amount of a suitable catalyst and heated to provide the alkenylphenylglycidyl ether capped hydroxy styryl pyridine and/or pyrazine. Suitable catalysts include bases, basic acting materials, acids and the like. Preferred catalysts are the quaternary ammonium salts and phosphonium salts. A most preferred catalyst is benzyltrimethylammonium chloride. Typically the reaction when catalyzed is conducted at a temperature of from about 50° C. to about 150° C., preferably from about 90° C. to about 120° C. for from about 15 minutes to about 6 hours preferably from about 30 minutes to about 4 hours.

Reaction times and temperatures are generally longer and higher, respectively, for the non-catalyzed reaction.

If desired, the reaction to provide the alkenylphenylglycidyl ether capped hydroxystyryl pyridine and/or pyrazine can be conducted in the presence of an inert solvent reaction medium. Suitable such solvents include, for example, glycol ethers, chlorinated hydrocarbons, ketones, mixtures thereof and the like. Preferred solvents include the monomethylether of propylene glycol and methyl isobutyl ketone.

The reaction of the alkenylphenylglycidyl ether and hydroxystyryl pyridine and/or pyrazine is conveniently followed by infrared spectrophotometric analysis and-/or by titration of an aliquot of the reaction product for residual epoxide groups.

The homopolymers (or copolymers) of the alkenylphenylglycidyl ether capped hydroxystyryl pyridines and/or pyrazines are prepared by heating with or without a free-radical forming catalyst and/or accelerator. Temperatures of from about 120° to about 350° C. are typically employed in the homopolymerization (curing) with temperatures of about 150° to about 250° C. being preferred. Suitable free radical forming catalysts which may optionally be used herein include the organic peroxides and hydroperoxides and azo or diazo compounds at concentrations of 0.001 to 2 percent by weight. Suitable accelerators which may optionally be used herein include the metal salts of an organic acid at concentrations of 0.001 to 0.5 percent by weight. Preferred free radical forming catalysts include t-butyl peroxybenzoate, dicumyl peroxide, di-t-butylperoxide, mixtures thereof and the like. Preferred accelerators include cobalt naphthenate and cobalt octoate. Partial homopolymerization (oligomerization or prepolymerization or B-staging) of the compositions of the present invention may be affected by using lower homopolymerization temperatures and/or shorter homopolymerization reaction times. Curing of the prepolymerized resin may then be completed at a later time or immediately following prepolymerization to comprise a single curing step. The process of the homopolymerization can conveniently be followed by viscometry and/or infra-red spectrophotometric analysis.

The copolymers of the alkenylphenylglycidyl ether capped hydroxystyryl pyridines and/or pyrazines are prepared by heating of a mixture of the aforementioned composition with one or more of the following:

(A) styryl pyridines and/or prepolymers and polymers thereof;
(B) vinyl styryl pyridines and/or prepolymers and polymers thereof;
(C) bismaleimides and/or polymaleimides;
(D) alkenylphenol capped styryl pyridines and/or prepolymers and polymers thereof;
(E) hydroxystyryl pyridines and/or prepolymers and polymers thereof;
(F) mixtures thereof.

Copolymerizable mixtures of the alkenylphenylglycidyl ether capped hydroxystyryl pyridines and/or pyrazines with (A) through (F) above can be formed and copolymerized in all proportions. Previously described conditions suitable for preparation of the homopolymers of this invention may also be used to prepared the copolymers of this invention.

The bis or polymaleimides optionally employed herein are represented by formulas

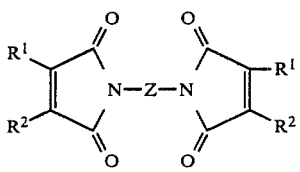

(VI)

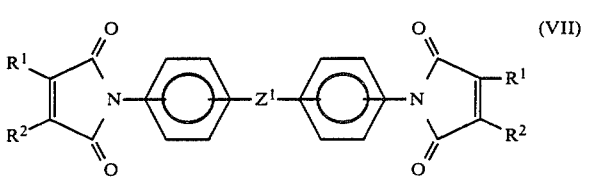

(VII)

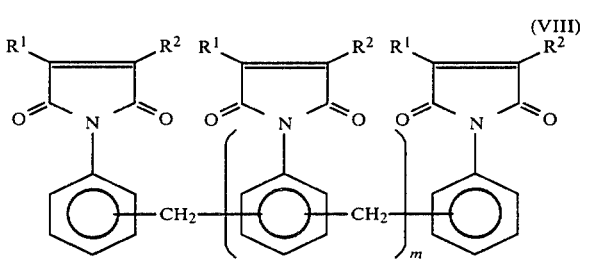

(VIII)

wherein $R^1$ and $R^2$ are as hereinbefore defined; Z is a divalent hydrocarbyl group having from 2 to about 12 carbon atoms; $Z^1$ is a direct bond, a divalent hydrocarbyl group with 1 to about 5 carbon atoms, —S—, —S—S—, —O—,

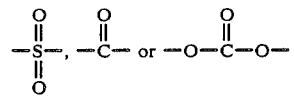

and m has an average value of 0.01 to about 10.

Typical bis or polymaleimides repesented by formulas VI, VII and VIII include N,N'-ethylenebismaleimide, N,N'-ethylenebis(2-methylmaleimide), N,N'-hexamethylenebismaleimide, N,N'-(oxydi-p-phenylene)bismaleimide, N,N'-(methylenedi-p-phenylene)bis(2-methylmaleimide), N,N'-(thiodi-p-phenylene)bismaleimide, N,N'-(sulfonyldi-m-phenylene)bismaleimide, N,N'-(isopropylidenedi-p-phenylene)bismaleimide, polymethylene polyphenylene polymaleimides and the like. The bis or polymaleimides may be used either alone or in any combination. The bis or polymaleimides can be prepared by reacting per amine group a stoichiometric quantity or a stoichiometric excess (up to about 5 percent excess) of a maleic anhydride with a diamine or polyamine in the presence of a suitable solvent. Methods for the preparation of the bis and polymaleimides are taught by U.S. Pat. Nos. 2,444,536 and 2,462,835.

The styrylpyridines and/or prepolymers and polymers thereof optionally employed herein are described by Ropars, et al in U.S. Pat. No. 3,994,862 and by Malassine et al in U.S. Pat. No. 4,163,740 which are incorporated herein by reference.

The vinylstyrylpyridines and/or prepolymers and polymers thereof optionally employed herein are described by Hsu, et.al. in Vinylstyrylpyridine-Modified Bismaleimide Composite Resins presented to the 29th National SAMPE Symposium, Apr. 3–5, 1984 and published on pages 1034–1042 of the proceedings of that symposium, as well as by Ratto, et al in U.S. Pat. No. 4,362,860.

The alkenylphenol capped styrylpyridines and/or prepolymers and polymers thereof optionally employed herein are described in Ser. No. 609,156 filed May 11, 1984 now U.S. Pat. No. 4,500,690, granted Feb. 19, 1985. The hydroxy styryl pyridines and/or prepolymers and polymers thereof optionally employed herein are prepared based on the references previously cited herein.

The alkenylphenylglycidyl ether capped hydroxystyryl pyridine and/or pyrazine copolymers can be prepared in a similar manner to the preparation of homopolymers of alkenylphenylglycidyl ether capped hydroxystyryl pyridines and/or pyrazines.

The compositions of the present invention are useful in the preparation of homopolymers and copolymers with a high degree of thermal stability, moisture resistance and chemical resistance. Many of the copolymer compositions of the present invention also offer improved mechanical properties. The alkenylphenylglycidyl ether capped hydroxystyryl pyridine and/or pyrazine compositions offer excellent processability, solvent solubility and high reactivity and are thus suited to the preparation of a wide range of castings, preimpregnated cloths or mats, laminates with heat resistant fibers. Examples of these are graphite reinforced composites, carbon fiber reinforced composites, aramid fiber reinforced composites, asbestos fiber reinforced composites, glass fiber reinforced composites, metal fiber reinforced composites, coatings, highly filled castings, and the like. If desired, other materials can be employed, such as, for example, fillers, pigments, dyes, other additives and the like. These products are especially suited for use in high temperature environments such as engine compartments, fire-walls and the like.

The following examples are illustrative of the invention but are not to be construed as to limiting the scope thereof in any manner.

EXAMPLE 1

Preparation of a p-Isopropenylphenylglycidyl Ether Capped Hydroxystyryl Pyridine p-Isopropenylphenylglycidyl ether (13.50 grams/0.0709 mole), a hydroxystyryl pyridine (15.00 grams/0.0709 mole of —OH groups), 60% aqueous benzyltrimethylammonium chloride solution (0.0475 grams/0.10 percent by weight active) and propylene glycol monomethylether (50.0 grams) were added to a reactor and maintained at room temperature with stirring under a nitrogen atmosphere. Heating of the reaction mixture commenced and once 90° C. was achieved, a solution formed. The solution was held at 110° C. for a total of 3 hours of reaction after which time the solution was cooled and propylene glycol monomethylether solvent removed by rotary evaporation at 100° C. and 10 mm for 1 hour. The product was recovered in quantitative yield as a thick, amber colored viscous liquid. Infrared spectrophotometric analysis of a film sample of the product confirmed the product structure for the p-isopropenylphenyl glycidyl ether capped hydroxystyryl pyridine (presence of ether absorbance accompanied by disappearance of epoxide absorbance, reduction of hydroxyl group absorbance and retention of trans-unsaturation absorbance).

The portion of hydroxystyryl pyridine used herein was prepared from a reaction of 2,4,6-trimethylpyridine, p-hydroxybenzaldehyde and 2,6-dimethylpyridine, as follows:

2,4,6-trimethyl pyridine (588.0 grams, 4.85 moles) and zinc chloride catalyst (26.0 grams) were added to a reactor and heated with stirring under a nitrogen atmosphere to a reflux. The reaction mixture was cooled to 150° C. then p-hydroxy benzaldehyde (887.0 grams, 7.26 moles) was added in 100 to 150 gram aliquots over a 110 minute period and so as to maintain the reaction temperature between 145° to 154° C. After addition of the p-hydroxy benzaldehyde was complete, the reaction temperature was increased to 160° C. After 4 hours of reaction at the 160° C. temperature, 2,6-dimethylpyridine (560.0 grams, 5.23 moles) was added to the reactor, then collection of a methyl pyridines—water azeotrope into a Dean Stark trap—cold water condenser assembly began. After 150 milliliters of azeotrope was collected, 150 milliliters of fresh 2,6-dimethylpyridine was added to the reaction mixture. The reaction was allowed to progress for an additional 4 hours at the 160° C. reaction temperature followed by cooling to room temperature. After this time, the final reaction stoichiometry was a 1 to 1.5 to 1 mole ratio of 2,4,6-trimethylpyridine to p-hydroxy benzaldehyde to 2,6-dimethylpyridine.

Portions of the hydroxy styryl pyridine product were worked up as needed by vigorously mixing the dark caramel colored viscous reaction product from above with an excess of methylene chloride. This provided a methylene chloride insoluble light orange colored powder which was recovered by filtration. The powder was multiply washed with an excess of boiling water and then dried under vacuum at 100° C. to a constant weight. Infrared spectrophotometric analysis demonstrated a lack of aldehyde absorbance (1670 cm$^{-1}$), thus indicating that the hydroxy benzaldehyde was totally reacted. As expected, trans-unsaturation absorbance was found to be present (970 cm$^{-1}$). Aromatic carbon-oxygen absorbance (1250 cm$^{-1}$) and phenolic hydroxyl group absorbance (3300 cm$^{-1}$) confirmed the presence of the phenolic groups. Titration demonstrated the presence of 8.04 percent by weight phenolic hydroxyl groups. The product had a melting point range of 160° to 170° C.

EXAMPLE 2

Homopolymerization of p-Isopropenylphenylglycidyl Ether Capped Hydroxystyryl Pyridine A 1.00 gram portion of the p-isopropenylphenylglycidyl ether capped hydroxystyryl pyridine from Example 1 and 0.0002 gram of cobalt naphthenate (6 percent active) were combined and then used to cast a film on an aluminum plate. The film and plate were placed in a vented, forced-air, convection type oven and cured at 225° C. for 4.0 hours. After this time, the cured homopolymer was recovered as dark amber semi-transparent, rigid film.

EXAMPLE 3

Thermogravimetric Analysis (TGA) of the Homopolymer of p-Isopropenylphenylglycidyl Ether Capped Hydroxystyryl Pyridine Thermogravimetric Analysis (TGA) of a 11.09 milligram portion of the homopolymer film from Example 2 was performed. Weight loss was recorded as a function of temperature at 10° C. per minute rate of increase in a stream of nitrogen flowing at 35 cubic centimeters per minute. The results are reported in Table I.

TABLE I

| Weight Loss (%) | | | | | | |
|---|---|---|---|---|---|---|
| 100° C. | 300° C. | 350° C. | 400° C. | 500° C. | 700° C. | 950° C. |
| 0 | 1.0 | 7.4 | 23.4 | 48.2 | 54.9 | 56.7 |

EXAMPLE 4

Copolymerization of p-Isopropenylphenylglycidyl Ether Capped Hydroxystyryl Pyridine and N,N'-(methylenedi-p-phenylene)bismaleimide (10 percent by weight)

A 0.90 gram portion of the p-isopropenylphenylglycidyl ether capped hydroxystyryl pyridine from Example 1, 0.10 gram of N,N'-(methylenedi-p-phenylene)-bismaleimide and 0.0002 gram of cobalt naphthenate (6 percent active) were combined and then used to cast a film on an aluminum plate. The film and plate were placed in a vented, forced-air, convection-type oven and cured at 225° C. for 4.0 hours. After this time, the cured copolymer was recovered as a dark amber, rigid film.

The portion of N,N'-(methylenedi-p-phenylene)-bismaleimide used herein was prepared as follows:

A 106.0 gram portion of maleic anhydride (1.08 moles) and 400 milliliters of N,N-dimethylformamide were added to a reactor and maintained under a nitrogen atmosphere with stirring. The stirred solution was cooled to 5° C. then 107.0 grams of methylenedianiline (0.54 mole) dissolved in 200 milliliters of N,N-dimethylformamide was added to the reactor over a sixty minute (3600 s) period and so as to maintain the reaction temperature at 5° to 10° C. After completion of the methylenedianiline in N,N-dimethylformamide solution addition the reactor was maintained at 5° to 10° C. for an addition 120 minutes (7200 s). The reactor was then allowed to warm to room temperature (25° C.), and the reaction product was removed and rotary evaporated at 55° to 60° C. under vacuum. After approximately 300 milliliters of N,N-dimethylformamide and water had distilled off, a voluminous light yellow colored precipitate formed and was recovered by filtration. The recovered precipitate was recrystallized from acetone and then dried in a vacuum oven at 80° C. The bismaleimide of methylenedianiline (172.6 grams) was recovered in 89.2 percent yield as a light yellow colored powder. Infrared spectrophotometric analysis of a potassium chloride pellet of the product confirmed the product structure. Nuclear magnetic resonance spectroscopy provided further confirmation of the product structure.

EXAMPLE 5

TGA of the copolymer of p-Isopropenylphenylglycidyl Ether Capped Hydroxystyryl Pyridine and N,N'-(methylenedi-p-phenylene)bismaleimide (10 percent by weight)

The TGA of a 10.53 milligram portion of the copolymer film from Example 4 was performed using the method of Example 3. The results are reported in Table II.

TABLE II

| Weight Loss (%) | | | | | | |
|---|---|---|---|---|---|---|
| 100° C. | 300° C. | 350° C. | 400° C. | 500° C. | 700° C. | 950° C. |
| 0 | 1.0 | 6.7 | 24.5 | 45.0 | 51.7 | 53.2 |

EXAMPLE 6

Copolymerization of p-Isopropenylphenylglycidyl Ether Capped Hydroxystyryl Pyridine and N,N'-(methylenedi-p-phenylene)bismaleimide (20 percent by weight)

The copolymerization of Example 4 was repeated using 0.80 grams of the p-isopropenylphenylglycidyl ether capped hydroxystyryl pyridine from Example 1, 0.20 gram of N,N'-(methylenedi-p-phenylene)bismaleimide and 0.0002 gram of cobalt naphthenate (6 percent active). A film was cast on an aluminum plate and cured as set forth in Example 4.

EXAMPLE 7

TGA of the copolymer of p-Isopropenylphenylglycidyl Ether Capped Hydroxystyryl Pyridine and N,N'-(methylenedi-p-phenylene)bismaleimide (20 percent by weight)

The TGA of a 7.00 milligram portion of the copolymer film from Example 6 was performed using the method of Example 3. The results are reported in Table III.

TABLE III

| Weight Loss (%) | | | | | | |
|---|---|---|---|---|---|---|
| 100° C. | 300° C. | 350° C. | 400° C. | 500° C. | 700° C. | 950° C. |
| 0 | 0.8 | 4.3 | 16.2 | 35.2 | 44.9 | 47.5 |

EXAMPLE 8

Preparation of a Cured Glass Laminate Using p-Isopropenylphenylglycidyl Ether Capped Hydroxy Styryl Pyridine and N,N'-(methylene-di-p-phenylene)bismaleimide A 25.0 gram portion of the p-isopropenylphenylglycidyl ether capped hydroxy styryl pyridine from Example 1, 15.0 grams of N,N'-(methylenedi-p-phenylene)bismaleimide and 150 grams of methylene chloride were combined to form a mixture. A set of three 12-inch by 12-inch woven fiberglass cloth pieces were then equally impregnated with the mixture. The fiberglass cloth used was a commercial-grade product treated with a proprietary coupling agent (Burlington 76-28 electrical laminating cloth) and had an average weight of 0.14 gram per square inch. The set of impregnated cloths were allowed to dry for 15 minutes at room temperature followed by additional drying in a vented, forced-air, convection-type oven for 5 minutes at 100° C. Each cloth was cooled and found to be tack-free at room temperature and then cut to provide ten 6-inch by 6-inch pieces which were loaded into a stainless steel frame and placed between stainless steel plates which had been treated with a silicone mold release. The plates were loaded into a 225° C. hot press (Pasadena Hydraulics, Inc. Model P-215) and maintained for four hours at 5000 psig. After this time a 6-inch by 6-inch by 1/16-inch light amber colored, rigid laminate was recovered and cut to provide a set of six 1-inch by 2-inch by 1/16-inch flexural strength test pieces. The flexural strength test pieces were tested on an Instron machine with standard methods (ASTM D-790). The Instron machine was set at a 1 inch span, 0.02 inch per minute crosshead speed and a 0.5 inch per minute chart speed. The Barcol hardness value is on the 934-1 scale. The results are reported in Table IV.

TABLE IV

| Barcol Hardness | 61 |
|---|---|
| Flexural Strength (psi) | 36,663 |
| Flexural Modulus (psi) | 3,267,000 |

EXAMPLE 9

Reactivity of Alkenylphenylglycidyl Ether Capped Hydroxystyryl Pyridine

A portion (0.2 gram) of the hydroxystyryl pyridine precursor used in Example 1 and a portion (0.2 gram) of the alkenylphenylglycidyl ether capped hydroxystyryl pyridine from Example 1 were placed in an oven maintained at 185° C. The alkenylphenylglycidyl ether capped hydroxystyryl pyridine gelled to a solid in less than 5 minutes. The hydroxystyryl pyridine did not gel, even after 2 hours and 45 minutes at the 185° C. temperature.

EXAMPLE 10

A set of 3 flexural strength test pieces from the cured fiberglass laminate of Example 8 were weighed and then placed in a glass jar, immersed under deionized water and then sealed. The jar was maintained for 8 days (192 hours) at 75° C. after which time the test pieces were removed, blotted, weighed and immediately tested on an Instron machine using the method of Example 8. The results are reported in Table V with the unexposed values (zero exposure to water) provided for comparison.

TABLE V

| Barcol Hardness | |
|---|---|
| unexposed | 61 |
| exposed | 50 |
| (percent change) | (−18.03) |
| Flexural Strength, psi | |
| unexposed | 36,663 |
| exposed | 32,646 |
| (percent change) | (−10.96) |
| Flexural Modulus, psi | |
| unexposed | 3,267,000 |
| exposed | 3,021,000 |
| (percent change) | (−7.53) |

EXAMPLE 11

Reaction of p-Isopropenylphenylglycidyl Ether and a Hydroxystyryl Pyridine p-Isopropenylphenylglycidyl ether (0.45 gram/0.0024 mole), a portion (0.50 gram/0.0024 mole of —OH groups) of the hydroxystyryl pyridine prepared in Example 1 and acetone (1.0 gram) were thoroughly mixed until a homogeneous paste was formed. After devolatilization of most of the acetone solvent at room temperature (25° C.), the mixture was placed in a vented, forced-air, convection type oven and maintained at 125° C. for 30 minutes. The resulting liquid dark red colored product was then cured at 240° C. for 4.0 hours. After this time, the cured polymer was recovered as a black, rigid solid.

EXAMPLE 12

Copolymerization of p-Isopropenylphenylglycidyl Ether and a Hydroxystyryl Pyridine with a Vinylpolystyryl Pyridine p-Isopropenylphenylglycidyl ether (0.45 gram/0.0024 mole), a portion (0.50 gram/0.0024 mole of —OH groups) of the hydroxystyryl pyridine prepared in Example 1 and acetone (1.0 gram) were thoroughly mixed until a homogeneous paste was formed. After devolatilization of most of the acetone solvent at room temperature (25° C.), the mixture was placed in a vented, forced-air, convection type oven and maintained at 100° C. for 15 minutes. The resulting liquid dark red colored product was thoroughly mixed with a vinylpolystyryl pyridine (0.238 grams) until a homogeneous paste was formed. The mixture was then maintained at 125° C. for 30 minutes and cured at 240° C. for 4.0 hours. After this time, the cured copolymer was recovered as a black, rigid solid.

The portion of vinylpolystyryl pyridine used herein was prepared from a reaction of 2,4,6-trimethyl-pyridine, terephthaldehyde and 2-methyl-5-vinyl pyridine as follows:

Terephthaldehyde (6.03 grams, 4.5 moles), 2,4,6-trimethylpyridine (363 grams, 3.0 moles) and acetic acid (540 grams, 9.0 moles) were added to a 4 liter glass resin kettle equipped with a mechanical stirrer, thermometer, nitrogen inlet, and condenser. The combined reactants were maintained under a nitrogen atmosphere with stirring then 5 minutes later acetic anhydride (918 grams, 9.0 moles) was added. The reaction mixture was heated to 140° C. and allowed to reflux. After 7 hours of reaction at the 140° C. temperature, the reaction mixture was cooled to 100° C. and 2-methyl-5-vinyl pyridine (536 grams, 4.5 moles) was added. The reaction mixture was reheated to 120° C. and maintained for an additional 7 hours. At that time, the reaction product was cooled to 100° C. and neutralized with 10 percent aqueous sodium hydroxide. The aqueous layer was decanted and the resulting mustard colored product was multiply washed with deionized water. The washed product was dissolved to form a 10 percent by weight solution in tetrahydrofuran and this solution was filtered. The filtrate was poured over ice and allowed to stand for five minutes. The precipitated product was recovered by adding the product-ice slurry to a large excess of deionized water followed by filtering. The solid, powdery product was recovered in the filter and again water washed, followed by drying under vacuum (30 inches Hg) at 75° C. Gel permeation chromatographic analysis using polystyrene standards demonstrated an average molecular weight of 2500.

EXAMPLE 13

Copolymerization of p-Isopropenylphenylglycidyl Ether and a Hydroxystyryl Pyridine with an p-Isopropenylphenol Capped Polystyryl Pyridine p-Isopropenylphenylglycidyl ether (0.45 gram/0.0024 mole), a portion (0.50 gram/0.0024 mole of —OH groups) of the hydroxystyryl pyridine prepared in Example 1 and acetone (1.0 gram) were thoroughly mixed until a homogeneous paste was formed. After devolatilization of most of the acetone solvent at room temperature (25° C.), the mixture was placed in a vented, forced-air, convection type oven and maintained at 100° C. for 15 minutes. The resulting liquid dark red colored product was thoroughly mixed with a p-isopropenylphenol capped polystyryl pyridine (0.238 grams) until a homogeneous paste was formed. The mixture was then maintained at 125° C. for 30 minutes and cured at 240° C. for 4.0 hours. After this time, the cured copolymer was recovered as a black, rigid solid.

The portion of p-isopropenylphenol capped polystyryl pyridine used herein was prepared from a reaction of 2,4,6-trimethylpyridine, terephthaldehyde and p-isopropenylphenol as follows:

Terephthaldehyde (890 grams, 6.6 moles) and 2,4,6-trimethylpyridine (534 grams, 4.4 moles) were added to a 2-liter glass resin kettle equipped with a mechanical stirrer, thermometer, nitrogen inlet and Dean Stark trap—cold water condenser assembly. The reaction mixture was heated to 100° C. using three infrared heating lamps and an automatic temperature controller. Once the terephthaldehyde had melted, the stirring was activated and 20 milliliters of concentrated sulfuric acid was added to the reactor. The nitrogen purge was set at 12.5 cubic centimeters per minute and maintained throughout the synthesis. Five minutes after addition of the sulfuric acid catalyst, the reaction mixture was heated to 175° C. and maintained therein for 0.75 hour during which time water and 2,4,6-trimethylpyridine collected into the Dean Stark trap. The reaction mixture was cooled to 155° C. then p-isopropenylphenol (140 grams, 1.2 moles) was added dropwise as a 50 percent by weight solution in acetone at such a rate as to maintain the reaction temperature between 152°–158° C. After 1 hour (including addition time for the p-isopropenylphenol-acetone solution) of reaction at 152°–158° C., the reaction mixture was cooled to room temperature (25° C.) and recovered as a solid product which was ground to a fine powder.

Portions of the powder were worked up as needed by dissolving in tetrahydrofuran followed by precipitation in water and filtration. The powder recovered by filtration was dissolved in acetone followed by precipitation in water and filtration. The solid, powdery product recovered in the filter was dried under vacuum (30 inches Hg) at 75° C. The melting point range of the p-isopropenylphenol capped polystyryl pyridine was 90° to 100° C.

EXAMPLE 14

TGA of a 5.87 milligram, 6.27 milligram and 5.92 milligram portion of the cured polymers from Examples 11, 12 and 13, respectively were performed using the method of Example 3. The results are reported in Table VI.

TABLE VI

| Sample Designation | Weight Loss (%) | | | | | | |
|---|---|---|---|---|---|---|---|
| | 100° C. | 300° C. | 350° C. | 400° C. | 500° C. | 700° C. | 950° C. |
| Example 11 | 0 | 1.2 | 5.6 | 24.2 | 46.2 | 53.7 | 55.0 |
| Example 12 | 0 | 0.5 | 3.7 | 13.6 | 30.9 | 40.7 | 46.6 |
| Example 13 | 0 | 0.1 | 1.8 | 9.8 | 31.7 | 40.9 | 43.2 |

I claim:
1. A thermosettable product which comprises the reaction product of
    (A) at least one of
        (1) one or more pyridine compounds represented by the formula

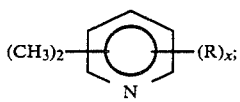

(2) one or more pyrazine compounds represented by the formula

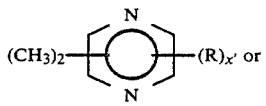

(3) a mixture of 1 and 2; with
    (B) a substituted aromatic aldehyde represented by the formula

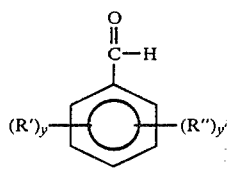

wherein each R is independently hydrogen, hydroxyl, methyl or ethyl; each R' is independently a hydroxyl or a

group; each R" is independently hydrogen, methyl or ethyl; x has a value of 3; x' has a value of 2; y has a value of 1 or 2; y' has a value of 3 or 4; the sum of y and y' has a value of 5; and with the proviso that at least one of R or R' is a hydroxyl group to provide a hydroxyl functional precursor which is then reacted with
    (C) an alkenylphenylglycidyl ether having the formula

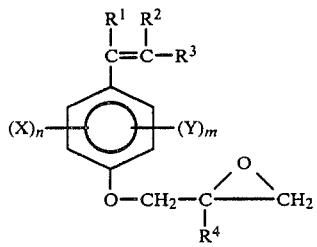

wherein each $R^1$, $R^2$, $R^3$ and $R^4$ is independently hydrogen or a hydrocarbyl group having from 1 to 3 carbon atoms; each X is independently hydrogen, a hydrocarbyl group having from 1 to 4 carbon atoms, chlorine, bromine, a phenyl group or a methoxy group; each Y is independently hydrogen or a hydrocarbyl group having from 1 to 4 carbon atoms and n and m are positive integers, and the sum of n plus m has a value of 4 whereby at least about one percent of the rings of the reaction product of (A) and (B) is etherified with said alkenylphenylglycidyl ether.

2. The reaction product of claim 1 wherein the molar ratio of (B) to (A) is in the range from about 0.33:1 to about 6:1 and the extent of etherification with said alkenylphenylglycidyl ether is about 20 to 100 percent.

3. The reaction product of claim 1 wherein the reaction of (A) and (B) is conducted at a temperature range from about 130° to about 230° C. and the reaction with (C) is conducted at a temperature in the range of 50° to about 150° C. in the presence of a basic or acidic catalyst.

4. Homopolymers of the reaction product of claim 1.

5. Copolymerizable mixtures of the reaction product of claim 1 with
    (A) styryl pyridines and/or prepolymers and polymers thereof;
    (B) vinyl styryl pyridines and/or prepolymers and polymers thereof;
    (C) bismaleimides and/or polymaleimides;
    (D) alkenylphenol capped styryl pyridines and/or prepolymers and polymers thereof;
    (E) hydroxystyryl pyridines and/or prepolymers and polymers thereof;
    (F) mixtures of (A)–(E).

6. Copolymers of the reaction product of claim 1 with
    (A) styryl pyridines and/or prepolymers and polymers thereof;
    (B) vinyl styryl pyridines and/or prepolymers and polymers thereof;
    (C) bismaleimides and/or polymaleimides;
    (D) alkenylphenol capped styryl pyridines and/or prepolymers and polymers thereof;
    (E) hydroxystyryl pyridines and/or prepolymers and polymers thereof;
    (F) mixtures of (A)–(E).

7. A cured composite which comprises the product obtained by curing the product of claim 1 with heat resistant fibers.

8. A cured composite which comprises the product obtained by curing the product of claim 2 with heat resistant fibers.

9. A cured composite which comprises the product obtained by curing the product of claim 3 with heat resistant fibers.

10. A cured composite which comprises the product obtained by curing the product of claim 5 with heat resistant fibers.

* * * * *